United States Patent [19]

Forkner

[11] Patent Number: 4,483,127
[45] Date of Patent: Nov. 20, 1984

[54] COTTON MODULE COVER

[75] Inventor: Roy C. Forkner, Lubbock, Tex.

[73] Assignee: Lubbock Interstate Sales Co., Inc., Lubbock, Tex.

[21] Appl. No.: 388,178

[22] Filed: Jun. 14, 1982

[51] Int. Cl.³ .............................................. B65B 11/02
[52] U.S. Cl. ...................................... 53/580; 53/592; 53/390; 100/100
[58] Field of Search ................ 53/209, 219, 390, 391, 53/397, 459, 568, 580, 590, 592; 52/3; 206/83.5; 56/341; 100/100

[56] References Cited

U.S. PATENT DOCUMENTS

| | | | |
|---|---|---|---|
| 443,620 | 12/1890 | Orre | 206/83.5 |
| 761,318 | 5/1904 | McDonald | 52/3 |
| 1,293,451 | 2/1919 | Irwin | 206/83.5 |
| 1,871,101 | 8/1932 | Waltz | 52/3 |
| 3,091,066 | 5/1963 | Laurenzi | 53/209 X |
| 3,353,297 | 11/1967 | Gervais | 53/390 X |
| 3,879,049 | 4/1975 | Husky | 108/51.1 |
| 4,231,210 | 11/1980 | Nagode | 53/397 |

FOREIGN PATENT DOCUMENTS 1366076 9/1974 United Kingdom ...................... 52/3

Primary Examiner—John Sipos
Attorney, Agent, or Firm—Wendell Coffee

[57] ABSTRACT

A cotton module is one type of a stack of agricultural produce. A tarp is specially folded and mounted on the back gate of a cotton module builder. As the module builder is moved off a completed module, the tarp is unrolled onto the top of the module. The tarp is tied down using ground cords, which extend along the ground underneath the module. The ground cord is mounted on spools on the side wall of the module and is placed under the side walls while the side walls are elevated upon the conclusion of a move from an old location to a new one. Then, when the module builder is lowered and the module is built, the ground cords are in place. The tarp's sides are vented.

4 Claims, 9 Drawing Figures

COTTON MODULE COVER

BACKGROUND OF THE INVENTION

(1) Field of the Invention

This invention relates to tarps (tarpaulins), and more particularly to covering a stack of agricultural produce such as a cotton module with a tarp.

(2) Description of the Prior Art

Before this invention, it was known that it was desirable to cover a stack of agricultural produce with a tarp.

HUSKY U.S. Pat. No. 3,879,049 and HENSLEY et al. U.S. Pat. No. 4,257,200 discloses tarps over cotton modules. CONAGHAN U.S. Pat. No. 4,221,085 discloses a tarp over a haystack.

Before my invention, the only method disclosed to place the tarp over the stack of agricultural product was to manually unroll the tarp by a workman on top of the stack. For example, see FIG. 2 of the HUSKY patent.

Before my invention, there was a problem of tying down the edges of the tarp. HUSKY disclosed building a module upon a pallet and therefore, the tarp was tied down to the edges of the pallet. CONAGHAN disclosed holding the tarp down by tying it into the hay material. HENSLEY et al., discloses tying the tarp down by using a special spike inserted into the cotton module.

OCHIAI U.S. Pat. No. 4,043,085 discloses a tarp for covering a stack of lumber. This tarpaulin has a center waterproof section, and a side panel of air permeable material so that the top of the stack of lumber is kept dry, but the sides are permeable to air for the purposes of ventilation.

Before this application was filed, applicant caused a search to be made in the United States Patent and Trademark Office. In addition to the above identified patents, the searcher also reported TISMA U.S. Pat. No. 4,228,622 and WINTER U.S. Pat. No. 4,252,850 which do not seem pertinent to the applicant. However, the applicant wishes to call them to the attention of the Examiner, inasmuch as he believes the Examiner would be interested in them inasmuch as they were reported by an experienced searcher.

SUMMARY OF THE INVENTION

(1) New and Different Function

I have invented a better way to cover a cotton module or other stack of agricultural produce, such as a haystack.

I have found that if cords are placed upon the ground before the module is built and the module built over it, these cords can be used to secure the tarp. I prefer to use a polyester cord commonly sold for strapping. This is a synthetic plastic strap, tape, or flexible tension element and for a generic term I use the term "cord". It could be understood that other cordage, such as binder twine or the like could be used if it has sufficient strength and also sufficient resistance to rotting or mildew, inasmuch as it would be in contact with the ground underneath the haystack or cotton module and also be exposed to the sunlight above the haystack or cotton module. Further, in some cases it will be attached to the tarp for a period of several months will be exposed to rain, blowing sand and snow. For these reason, polyester tape is preferred as stated before, inasmuch as it has the necessary strength and resistance to deterioration.

I use the term "tarp" as equivalent to tarpaulin; however I am not using tarp in the technical sense, inasmuch as the entire covering is not waterproof.

I prefer to use a tarp or covering about twelve (12) feet wide. In modern agricultural conditions today, nearly all stacks of agricultural goods, either hay stacks or cotton modules are made to be loaded upon trucks for transport. Therefore, the width of these stacks is generally less than eight (8) feet at the top. Therefore, I prefer to use a tarp about twelve (12) feet wide and as long as is necessary to cover the length of the stack. It will be understood that normally the stacks will be of standard length, at least for any one product.

I invented a tarp being loosely woven 12 feet wide of polypropylene fiber, a strong, synthetic material. I prefer an open weave, so that before coating, it is air permeable. Then the center 9½ feet of the tarp is treated with polypropylene liquid so that it forms a waterproof coating. This procedure leaves an uncoated edge of about 1¼ foot on each side. When the tarp is placed over the stack, the top of the stack will be covered with the 9½ foot center waterproof strip and a small amount of the side of the stack will be covered with waterproof material. It is desirable and necessary for the tarp to extend along the sides to properly hold the covering in place. The side material will be air permeable, as desired. The tarp's strength is from the fabric which is 12 feet wide without seams.

I prefer to leave the 1¼ foot edges uncoated so that it is air permeable. Moisture may be present in the stack because the materials of which the stack is made may have been wet at the time. The stack may be wet because blowing rain or snow against the side of the stack may introduce water into the stack. With the side edges permeable, air can freely pass underneath the cover so that moisture in the agricultural product can dry out. The circulation of air through the permeable side is therefore desirable for this purpose.

I have discovered that if the straps are placed on the ground, and a stack made over them, the straps can hold tighter and longer. Also because of a certain amount of elasticity in the straps, or the like, that normally the tarp can be placed over the stack better if the straps were longer. Having the straps extending under the bottom of the stacks results in longer straps. Also, as stated before the difficulty in anchoring the end of the straps, that by placing the straps underneath the entire stack, this problem is eliminated. For ease of constructing, I find it better to use a ground cord from underneath the stack for about five (5) or six (6) feet above the bottom of the stack. Three short cords are connected from the end of the ground cord to the tarp. Three short cords can be tied to each of the ground cords conveniently.

It will be understood that the stacks are usually over six (6) feet tall, and therefore difficulty is had in getting the tarps on top of them and rolled out. However, normally these stacks are built by a special builder. A cotton module is built by a module builder. Typically these module builders have two sides with a packer between the sides and a back gate. I have invented a system where the ground cord is mounted on spools along one side of the module builder. Then as the builder is moved to a new location, the sides are elevated by the wheels, the straps are pulled under the side walls and attached conveniently to a fastener on the other side. Then the builder can be lowered upon the straps and the stack built over the straps.

On the back gate of the builder, I have invented a bracket which will carry a spindle. The tarp is rolled and placed on the spindle so that when the module or stack has been built, the back gate is open, placing the tarp at an elevation above the top of the module or stack. Then as the builder is pulled forward, the tarp can be unrolled on top of the module builder.

I have further invented a way of folding the tarp so that after it has been unrolled on top, the sides can be pulled down. I.e. that the twelve (12) foot tarp is folded so that there is a center panel about three (3) feet wide. Then the two edge panels are accordion-folded over the top of the center section. Therefore, after the tarp has been unrolled the edges will be near the outer edge of the top of the stack and can be pulled down to pull along the side of the stack.

Therefore, it may be seen that the total function of the combinations which forms my invention far exceeds the sum of the functions of the individual elements such as cords, spindles, fasteners, etc.

(2) Objects of this Invention

The object of this invention is to cover a stack of agricultural product.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

Still further objects are to build a cover for a stack of agricultural product so that the stack is covered in an economical manner, is well-preserved, is easy to uncover and the covering reused.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENT

Figure 1:
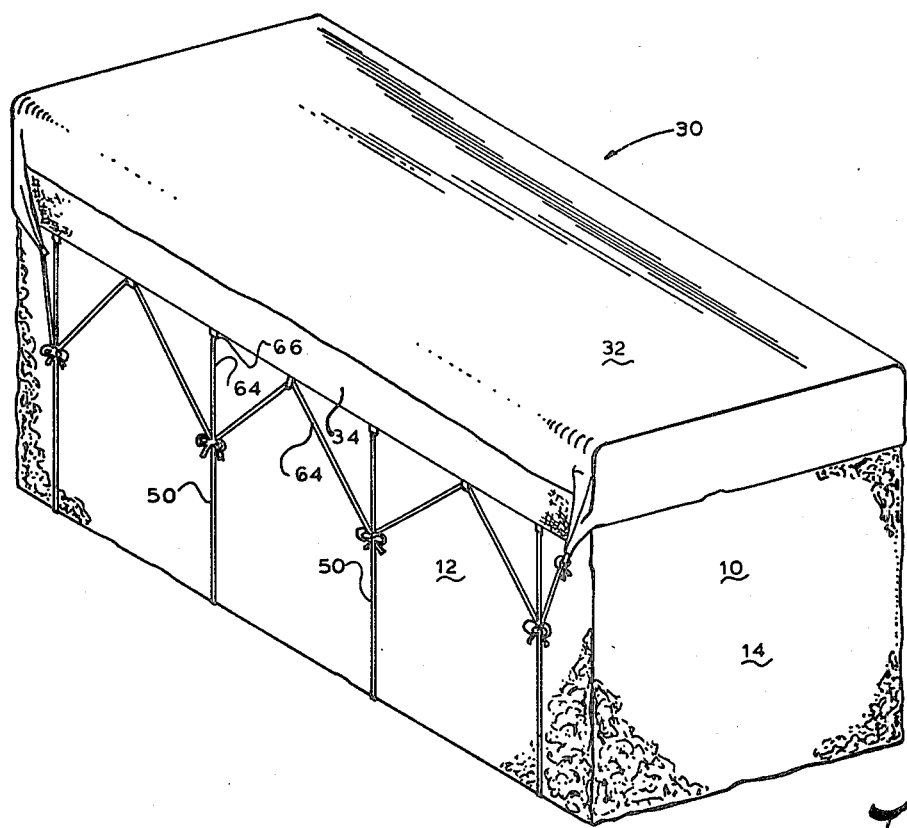
FIG. 1 is a perspective view of a stack of agricultural produce covered according to my invention.

Referring to the drawings there may be seen a module 10. As explained before, the module is just one example of a stack of agricultural produce. The module will basically be rectangular, having a long rectangular side 12. As stated before, the width across the end 14 of the module 10 will be of a size that can be transported upon highways.

The module 10 is constructed by a module builder 16 having two side walls 18 and 20 and back gate 22. Packer 24 extends across the side walls to pack the cotton into the module. Wheels 26 are mounted on each of the sides. Hydraulic cylinder 28 raise and lower the wheels, thus forming means for raising and lowering the side walls as well as the wheels. Module builders are old and well-known to the art.

The tarp 30 includes a center portion 32 which is covered or coated with polypropylene to make this portion waterproof. As seen in FIG. 1, the sides 34 are uncoated and made of loosely woven fabric. Therefore, air can circulate under the sides of the module to prevent an accumulation of moisture from damaging the module.

Figure 2:
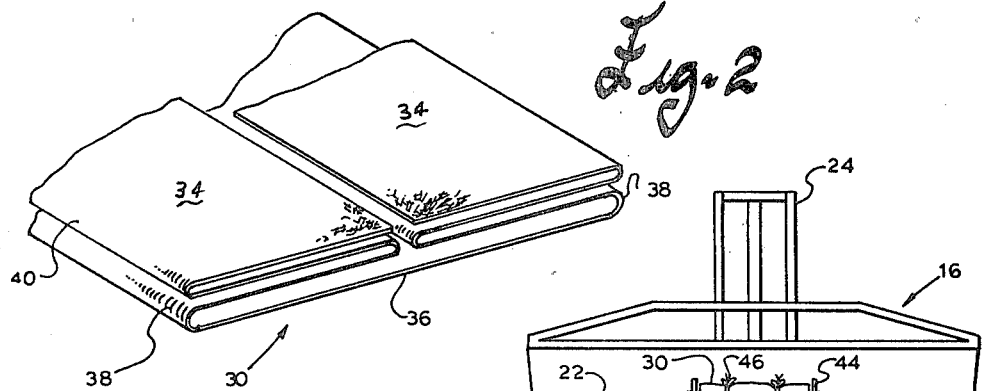
FIG. 2 is a partial perspective view of a part of the tarp folded before rolling.
Figure 4:
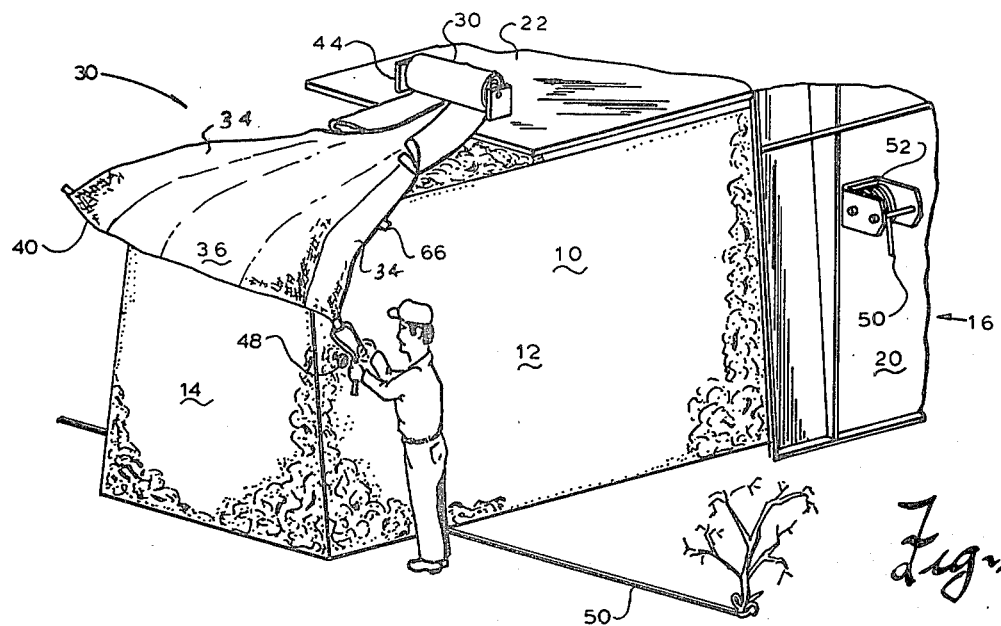
FIG. 4 is a back perspective view of the module builder being moved away from the module with the tarp being spread over the module.
Figure 8:
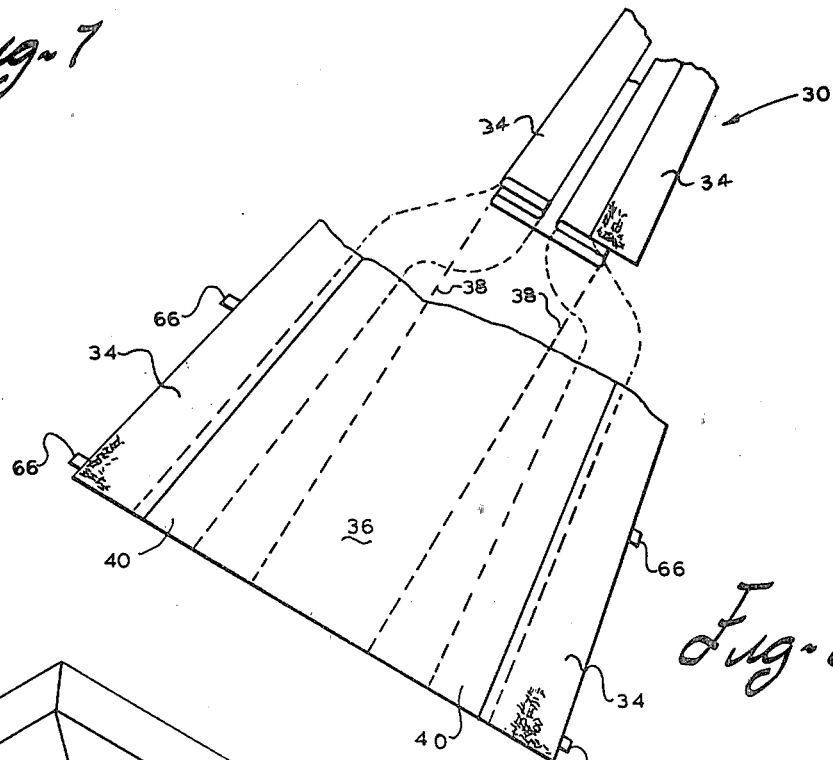
FIG. 8 is a perspective view of the unrolled tarp as it is being unfolded.

The tarp 30 is folded as shown in FIG. 2. The tarp will be laid out on a long, large table. There will be what is designated as a center panel 36. The center panel will be defined by a fold 38 on each side. This is also shown in FIG. 8 at the time the tarp is unfolded. The tarp when folded will be about ¼ the width of the unfolded tarp 30. Therefore if a 12 foot tarp is used, as discussed above, the center panel will be about three feet wide. The panels on each side of the fold 38 are called folded panels 40, which will be of equal width, and therefore it may be seen that each of them will be about 4½ feet wide. They will be folded in accordion folds on top of the center panel 36. It may be seen that if none of the folds are greater than 18 inches apart that the accordion folds of the folded panels 40 will not overlap the center of the center panel 36. Therefore, as the tarp is being unfolded and particularly as seen in FIG. 4, the folded panels 40 may be pulled out from the tarp and spread over the side of the module 10. In this description it is necessary to distinguish between the panels 36 and 40, which describe the way the tarp 30 is folded, and portions 32 and sides 34 which describe the construction for the tarp 30.

Figure 3:
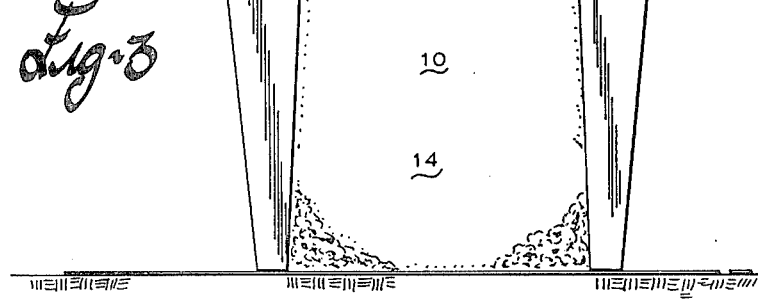
FIG. 3 is a back elevational view of a cotton module builder with the back gate open but before the sides are raised for moving.
Figure 5:
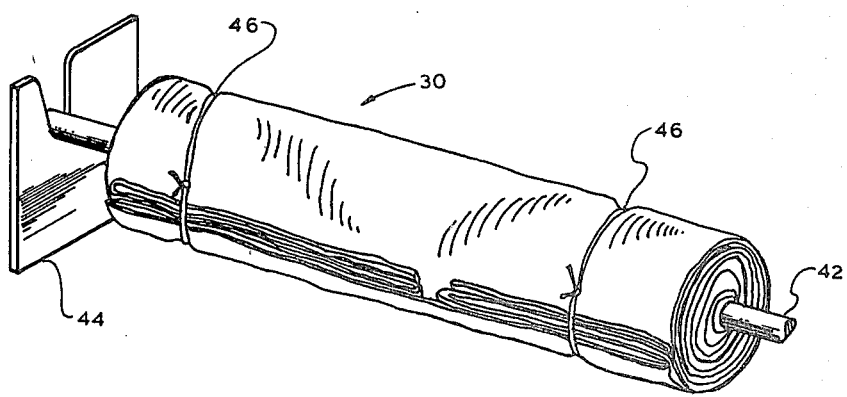
FIG. 5 is a perspective view with one end broken away for clarity of a rolled tarp mounted upon a bracket.
Figure 6:
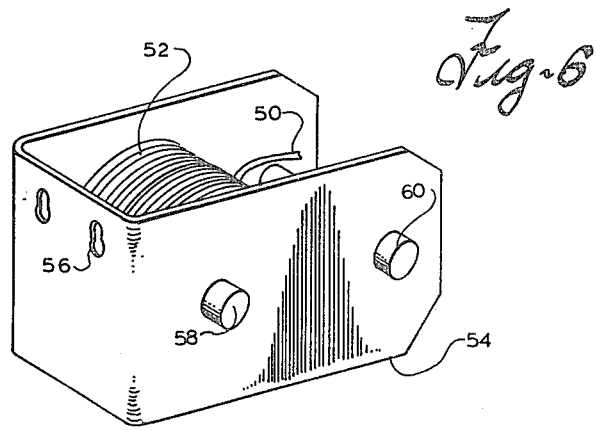
FIG. 6 is a perspective view of the spool of ground cord detached from the side of the module builder.
Figure 9:
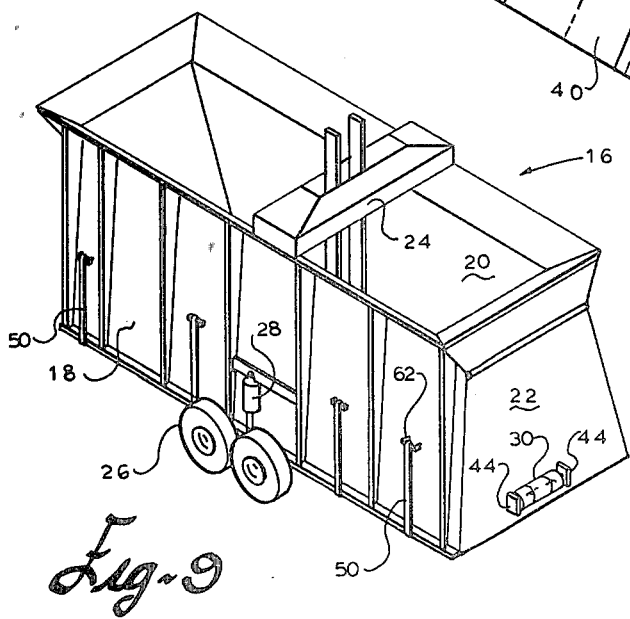
FIG. 9 is a perspective view of the module builder showing the ground cord fasteners and the tarp on the back gate with the back gate in the down position.

After the tarp 30 has been folded as shown in FIG. 2, then the tarp 30 for one module 10, which is about 30 feet long, is rolled in a tight roll as seen in FIG. 5. After it has been rolled, a pipe or spindle 42, can be inserted through the center of the roll. This spindle 42 can be mounted upon bracket 44 on the back gate 22. The bracket 44 are mounted near the bottom of the back gate 22 when the back gate is closed or down as seen in FIG. 9, and near the rear when the back gate is raised, as seen in FIGS. 3 and 4.

The rolled tarp is conveniently tied by cords 46 when the tarp is placed upon the bracket 44. Of course the tarp will be placed upon the back gate 22 when the back gate is in the down position as seen in FIG. 9. It will be noted that the tarp is placed on the bracket 44 so that the tarp feeds from the bottom so that as the tarp is unrolled, the accordion folded panels 40 will be on top of the center panel 36 for convenient unfolding as seen in FIG. 4.

Immediately before the back gate 22 is raised, it is desirable for a workman to unroll two or three feet of the tarp. Then as the back gate is raised to an elevation above the top of the module 10, the edges of the tarp will be within easy reach and grasp of the workman. Therefore, before the module builder 16 is moved forward, the corner edges of the tarp 30 may be secured temporarily to the module 10 by spike 48. Then as the module builder 16 continues to move forward off of the module 10, the edges of the tarp at the edge of the folded panels 40 can be continued to be pulled down along the side of the module and temporarily secured in place by spikes 48, which are carried by the workmen.

Those having skill in the art will understand that before the module builder 16 is moved, the wheels 26 are forced downward by the cylinder 28 thereby raising the side walls 18 and 20 from the ground. After the builder 16 has reached the new location, and while the side walls are still elevated, ground cords 50 will be pulled from spool 52, which is mounted upon the side wall 20 of the builder. There are a plurality of identical spools 52, and only one is described in detail since all the spools are identical. The spool 52 is conveniently mounted upon a spool holder 54 which has two keyhole slots 56 in the back thereof. The keyhole slots 56 fit against headed studs projecting from the side 20 of the module builder 16. The spool holder 54 has dowel 58 which serves as an axle for the spool 52. Also dowel 60 extends through the spool holder 54 as shown to provide a convenient carrying handle.

The ground cord 50 is pushed under the sides of the builder 16. A long pole such as a nine foot section of electrical conduit or a long fishing pole may be used for this purpose. On the side 18 of the builder 16 the ground cords 50 are attached to a fastener 62. The fasteners may take the form of a cleat or a clothes pin.

After the ground cord 50 is placed underneath the module builder 16 then the wheels 26 are raised by the cylinder 28 which lowers the sides 18 and 20 to the ground. Then the cotton is dumped into the builder 16 as customary for building a module. After the cotton is dumped into the builder it is tramped. The ground cords 50 may be cut free of the spool 52 and released from the fastener 62 so that they remain in place when the builder 16 is next moved.

While the module 10 is being formed, the workmen may return to the previously built module 10 and remove the temporary spikes 48 from the side of the module and permanently secure the tarp 30 to the ground cord 50. This is preferably done by short cords 64.

It will be understood that one end of each ground cord 50 will be on one side of the module 10 and the other end on the other side. Each end of the ground cord 50 will have three short cords 64 extending to loops 66 conveniently attached to the edges of the tarp.

Figure 7:
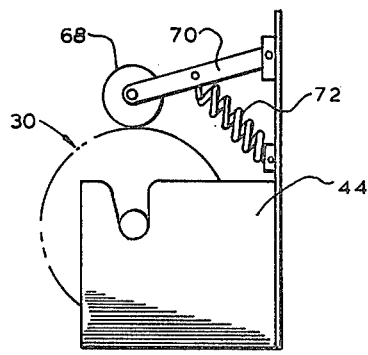
FIG. 7 is an end elevational view of the bracket to hold the tarp upon the back gate of the module builder.

To hold the tarp and prevent it from unwinding too freely after the cords 46 are removed, I prefer to mount a roller 68 upon the end of an arm 70, which is pivoted to the bracket 44 as seen in FIG. 7. Tension spring 72 extending between the bracket 44 and the arm 70 holds the roller 68 securely against the rolled tarp 30 preventing it from discharging the rolled tarp too freely.

More fully describing the tarp, the tarp will be a strip of air permeable fabric, loosely woven of polypropylene filament or fiber, without seams, 12 feet wide. The center portion 32 will have a moisture impermeable polypropylene coating between edges. This coating will be at least 8 feet wide because, in nearly all instances, the stack of agricultural product will be at least 7 feet wide. In many instances, the coating will be 9½ feet wide, because in some instances the stacks of agricultural product are wider. Adjacent to each edge, there will be a strip of uncoated fabric, which will be air permeable. This side 34 or strip along each edge, will be at least 1 foot wide. I have found that it is desirable to have a strip at least 1 foot wide to provide proper ventilation for the agricultural product within the stack. It will be understood that seams within a tarp form points where tears can occur. The tarp will be prepared in rows 12 feet wide and containing well over 1,000 running feet of material. Before being sold to the farmer, it will be cut in rectangles with a length about 4 or 5 feet longer than the stack the farmer intends to cover, i.e. about 30 feet or more. Then the ends will be hemmed to prevent fraying, and fasteners 66 will be sewn in all four corners of the rectangular tarp and three feet along each side and end.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| 10 | module | 42 | spindle |
|----|--------|----|---------|
| 12 | long side | 44 | bracket |
| 14 | end | 46 | cord |
| 16 | module builder | 48 | spike |
| 18 | side wall | 50 | ground cord |
| 20 | side wall | 52 | spool |
| 22 | back gate | 54 | spool holder |
| 24 | packer | 56 | slots |
| 26 | wheels | 58 | dowel |
| 28 | hydraulic cylinder | 60 | dowel |
| 30 | tarp | 62 | fastener |
| 32 | center portion | 64 | short cords |
| 34 | side | 66 | loops |
| 36 | center panel | 68 | roller |
| 38 | fold | 70 | arm |
| 40 | folded panels | 72 | tension spring |

I claim as my invention:

1. A builder for building a stack of agricultural product on the ground having
   a. two side walls,
   b. a tramper between the side walls for tramping agricultural product between the walls on the ground,
   c. wheels on the side walls,
   d. means on the side walls for elevating and lowering the wheels so that the side walls may be lowered to the ground or raised to move the builder, and
   e. a back gate pivoted at its top between the side walls to allow movement of the builder away from the built stack with the stack passing under a raised gate;

wherein the improvement comprises:
   f. a bracket mounted on the back gate,
   g. a horizontal spindle supported by said bracket, and
   h. a rolled tarp on the spindle, i. so that after the stack is built, the builder raised is, the back gate gate is raised, and as the builder is moved the stack passes out of the builder and the tarp is unrolled on the stack from the back door raised thereover.

2. The invention as defined in claim 1 including all of the limitations a. through i. with the addition of the following limitations:
   j. spools of ground cord journaled to one of said side walls,
   k. fasteners attached to the other of said side walls,
   l. so that when the builder is raised the cords may be laid on the ground and fastened to the fasteners, and then the stack built over the ground cords.

3. The invention as defined in claim 1 including all of the limitations a. through i. wherein said rolled tarp comprises:
   j. a flat center panel having a width of about two eighths the total width of the tarp,
   k. the center of the center panel being the center of the tarp whereby a:
   (i) folded panel extending on either side of the center panel,
   (ii) each folded panel being about three eighths of the total width of the tarp,
   (iii) each folded panel being accordion folded back on top of the center panel with no accordion fold being more than about one eighth of the total width of the tarp,
   l. so that the rolled tarp may be unrolled and the folded panels pulled out so that the tarp is extended to its full width.

4. The invention as defined in claim 3 including all of the limitations a. through l. with the addition of the following limitations:
   m. spools of ground cord journaled to one of said side walls,
   n. fasteners attached to the other of said side walls,
   o. so that when the builder is raised the cords may be laid on the ground and fastened to the fasteners, and then the stack built over the ground cords.

* * * * *